United States Patent
Tronc et al.

(10) Patent No.: US 9,266,302 B2
(45) Date of Patent: Feb. 23, 2016

(54) FLEXIBLE UNDERWATER PIPE INCLUDING A LAYER INCLUDING A POLYMER RESIN INCLUDING SURFACE-MODIFIED TITANIUM NANOPARTICLES

(75) Inventors: Frédéric Tronc, Rouen (FR); Alain Coutarel, Mont Saint Aignan (FR)

(73) Assignee: TECHNIP FRANCE (FR)

( * ) Notice: Subject to any disclaimer, the term of this patent is extended or adjusted under 35 U.S.C. 154(b) by 378 days.

(21) Appl. No.: 13/577,818

(22) PCT Filed: Feb. 8, 2011

(86) PCT No.: PCT/FR2011/050259
§ 371 (c)(1),
(2), (4) Date: Sep. 14, 2012

(87) PCT Pub. No.: WO2011/098717
PCT Pub. Date: Aug. 18, 2011

(65) Prior Publication Data
US 2013/0000734 A1    Jan. 3, 2013

(30) Foreign Application Priority Data

Feb. 9, 2010 (FR) .................................... 10 50886

(51) Int. Cl.
*F16L 11/08* (2006.01)
*B32B 1/08* (2006.01)
*B32B 27/20* (2006.01)

(52) U.S. Cl.
CPC . *B32B 1/08* (2013.01); *B32B 27/20* (2013.01); *F16L 11/083* (2013.01); *Y10T 137/0318* (2015.04)

(58) Field of Classification Search
CPC .......... B32B 1/08; F16L 11/083; F16L 11/16; F16L 11/08
See application file for complete search history.

(56) References Cited

U.S. PATENT DOCUMENTS

| | | | | |
|---|---|---|---|---|
| 4,186,123 A | * | 1/1980 | Kietzman | 524/322 |
| 6,232,265 B1 | * | 5/2001 | Bruening et al. | 502/401 |
| 7,123,826 B2 | | 10/2006 | Belcher | |
| 2005/0197428 A1 | * | 9/2005 | May | 523/210 |
| 2006/0013980 A1 | * | 1/2006 | Bowman | 428/36.91 |
| 2009/0143521 A1 | * | 6/2009 | Li et al. | 524/430 |
| 2009/0308475 A1 | | 12/2009 | Stringfellow et al. | |

FOREIGN PATENT DOCUMENTS

| | | | | |
|---|---|---|---|---|
| CN | 1865337 | | 11/2006 | |
| CN | 1865337 A | * | 11/2006 | |
| FR | 2 918 067 A1 | | 1/2009 | |
| WO | WO 2008/113362 A1 | | 9/2008 | |
| WO | WO 2008/119676 A1 | | 10/2008 | |
| WO | WO 2008/146048 A1 | | 12/2008 | |
| WO | WO 2009024156 A2 | * | 2/2009 | F16L 11/08 |

OTHER PUBLICATIONS

International Search Report dated May 12, 2011 issued in corresponding international patent application No. PCT/FR2011/050259.

* cited by examiner

*Primary Examiner* — Mark Kaucher
(74) *Attorney, Agent, or Firm* — Ostrolenk Faber LLP

(57) ABSTRACT

The disclosure relates to a flexible underwater pipe intended for transporting fluids, in particular hydrocarbons, comprising at least one layer comprising a polymer resin comprising surface-modified titanium dioxide nanoparticles bonded to the polymer by a covalent and/or hydrogen bond.

17 Claims, 1 Drawing Sheet

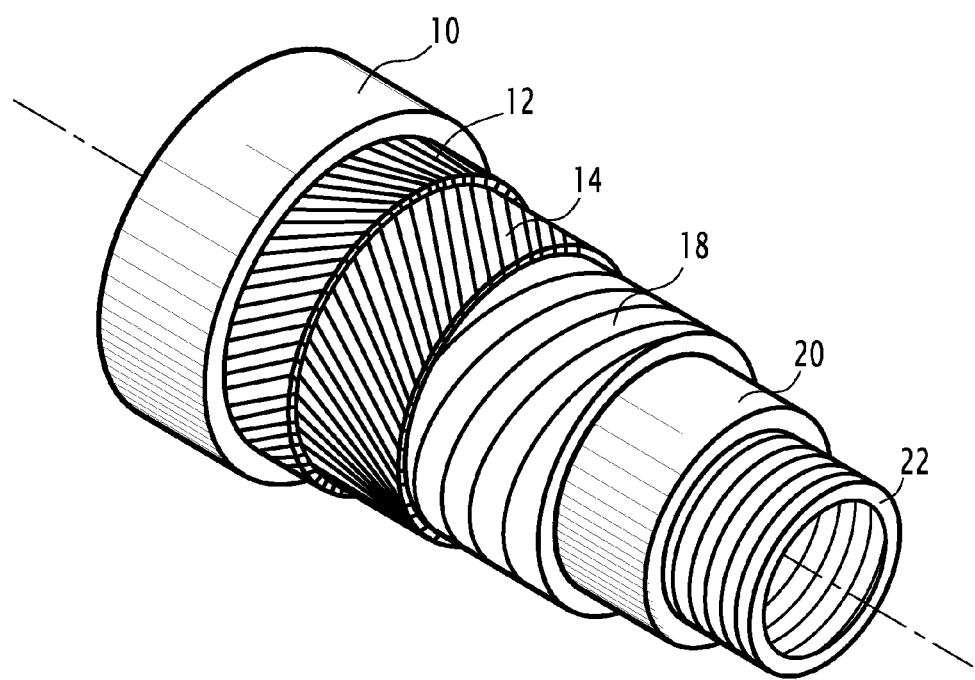

FLEXIBLE UNDERWATER PIPE INCLUDING A LAYER INCLUDING A POLYMER RESIN INCLUDING SURFACE-MODIFIED TITANIUM NANOPARTICLES

CROSS REFERENCE TO RELATED APPLICATIONS

The present application is a 35 U.S.C. §371 National Phase conversion of PCT/FR2011/050259, filed Feb. 8, 2011, which claims benefit of French Application No. 1050886, filed Feb. 9, 2010, the disclosures of which are incorporated herein by reference. The PCT International Application was published in the French language.

TECHNICAL FIELD

The present invention concerns a flexible underwater pipe for transporting fluids in deep water. These fluids are particularly gases or liquids, preferably hydrocarbons.

BACKGROUND OF THE INVENTION

Flexible pipes for conveying hydrocarbons, from outside to inside the pipe, generally comprise:
- an external polymeric sheath to protect the pipe assembly and in particular to prevent the ingress of seawater into its thickness,
- tensile armour plies,
- a pressure vault,
- an inner sealing polymeric sheath, and
- optionally a metal carcass.

If the pipe comprises a metal carcass it is termed a rough bore. If it is not fitted with a metal carcass it is termed a smooth bore. In general for the transport of hydrocarbons, a pipe fitted with a carcass is preferred and a pipe without a carcass is adapted for conveying water and/or pressurized water vapour.

The metal carcass and the pressure vault are formed of longitudinal elements wound at a short pitch and they impart radial strength to the pipe whilst the tensile armour plies are formed of wound metal wires of longer pitch to bear the load of axial forces.

The type, number, sizing and organization of the layers forming flexible pipes are essentially related to their conditions of use and installation. The pipes may comprise additional layers to those mentioned above.

In the present application, the notion of short pitch winding designates any helical winding at a helical angle close to 90°, typically between 75° and 90°. The notion of long pitch winding covers helical angles of less than 55°, typically between 25° and 55° for the armour plies.

These flexible pipes are particularly suitable for the subsea transport of fluids, hydrocarbons in particular, at great depths. More specifically, they are of so-called unbonded type and are described in the standard documents published by the American Petroleum Institute (API), API 17J and API RP 17B.

Flexible pipes can be used at great depth typically down to a depth of 2500 meters. They allow the transport of fluids, hydrocarbons in particular, having a temperature of more than 60° C., typically reaching 130° C. and possibly even exceeding 150° C. and an internal pressure possibly reaching 1000 bars, even 1500 bars.

The constituent material of the inner polymeric sealing layer must be chemically stable and capable of affording mechanical resistance to the transported fluid and its characteristics (composition, temperature and pressure). This material must combine characteristics of ductility, long-term resistance (in general the lifetime of the pipe must be at least 20 years), mechanical resistance to heat and pressure. This material must particularly be chemically inert to the constituent chemical compounds of the transported fluid.

Pipes comprising an inner polymeric sealing layer containing a polymer can particularly be used. However the thermo-mechanical properties of polymers under the conditions of use previously mentioned (high temperature and pressure, high acidity and presence of water) may be distinctly reduced. Numerous studies have therefore been reported in an attempt to improve these properties, in particular to improve their resistance to creep and their tensile or compressive strength.

The adding of fillers to polymer resins allows an improvement in the chemical and mechanical properties of resins. It is often considered that the improvement in mechanical properties means an increase in tensile and/or bending strength and/or increased rigidity. However, these improvements are not specifically sought in the field of undersea flexible pipes. The desired improvement in mechanical properties for undersea flexible pipes exposed to high temperatures and/or pressures is improved creep resistance and more specifically compressive creep resistance.

Creep is the extending or deformation of the polymer resin subjected to continuous stress. Creep occurs in any part in polymer subjected to stress. The cause is the viscoelastic flow of the polymer over time due to the mobility of the polymer chains relative to each other. High temperatures and/or pressures accelerate creep. Resins are therefore sought in which the mobility of the polymer chains in relation to each other is reduced.

The conveying via the flexible pipe of fluids under pressure and at high temperature subjects the inner sealing polymeric sheath (pressure sheath of the pipe) to conditions promoting the creep of the polymer material into the interstices (or voids) between the metal wire(s) wound on a short pitch and forming the pressure vault. This phenomenon has several disadvantages and must therefore be controlled or limited. Therefore, if the sealing layer undergoes excessive creep in the voids, local cracking or local ruptures of the pressure layer may occur which may, in extreme cases, generate loss of imperviousness. In addition, extensive creep may completely fill the interstices between the wires of the pressure vault and thereby limit the flexibility of the structure.

To solve this problem related to creep of the pressure sheath, the size of the voids between the wires of the pressure vault is generally controlled so as to limit the volume inside which the sheath is able to creep. For this purpose the pressure vault is generally formed of wires stapled together, the stapling system preventing the voids from becoming too large. In practice, the maximum distance between two adjacent wires (void width) is of the order of 2 to 3 mm. It is not advantageous to reduce the width of the voids excessively since an excessive reduction would limit the flexibility of the pressure vault and hence of the pipe.

It has therefore been sought by some to reduce the depth of the voids which led to inserting an anti-creep device of thin, flat wire type directly above the voids between stapled wires, to prevent creep inside the said voids as described by FIG. 3 in WO 00/09899. It is true that this solution allows efficient limiting of creep, particularly if the pressure vault is formed of wire of strong thickness, but it also proves to be fairly complex and difficult to implement.

Solutions are also known which consist of increasing the thickness of the pressure sheath and even of adding an intermediate layer between the pressure sheath and the pressure vault. This intermediate polymeric sheath is said to be sacrificial since its sole function is precisely to bear the load of the creep phenomenon and thereby protect the pressure sheath. These solutions generate major increases in material costs (the sacrificial sheath has a thickness of the order of 3 mm, which is far from being negligible since the thickness of the pressure sheath is commonly of the order of 8 to 11 mm) and/or conversion costs.

Documents U.S. Pat. No. 7,123,826, WO 2008/113362 and WO 2008/146048 disclose flexible pipes of which some polymeric layers contain nanoparticles. However these solutions do not allow the solving of the above-mentioned problem relating to creep of the inner sealing sheath.

SUMMARY OF THE INVENTION

One of the objectives of the present invention is therefore to provide an underwater flexible pipe comprising a polymer-based layer having improved creep resistance allowing the use thereof for the transport of fluids such as hydrocarbons, at high pressure and high temperature.

For this purpose, a first subject of the invention is a flexible underwater pipe intended for conveying fluids, hydrocarbons in particular, comprising at least one layer comprising a polymer resin containing surface-modified nanoparticles of titanium dioxide chemically bonded to the polymer.

The inventors have discovered that surface-modified nanoparticles of titanium dioxide chemically bonded to the polymer allow a reduction in the mobility of polymer chains relative to each other and hence an improvement in the creep resistance of the polymer, in particular an improvement in its compressive creep resistance.

By nanoparticles <<chemically bonded>> to the polymer is meant that there are chemical bonds between the polymer and the surface-modified nanoparticles of titanium dioxide, for example a covalent, ionic or hydrogen bond. Preferably the surface-modified nanoparticles of titanium dioxide are bonded to the polymer via covalent and/or hydrogen bonds.

By <<surface-modified>> nanoparticle of titanium dioxide is meant that a nanoparticle, on its surface, comprises at least one group able to form a chemical bond with the polymer. By <<group able to form a chemical bond>> is meant any atom, function able to form a chemical bond or any group carrying said atom or said function.

The groups able to form a chemical bond may be of most varied type. Each group able to form a chemical bond on the surface of the titanium dioxide nanoparticles typically has the following formula (I):

$$\text{—O-L-}(R^i)_n \quad (I),$$

wherein:

n is 1, 2 or 3,

-L- is a linker substituted by n $R^i$ groups, L being chosen from among:

a group: -L'-, —(O)-L'-, —(CO)—NH-L'-, —Si-(A)$_{3-n}$(L')$_p$(O-L')$_q$- or

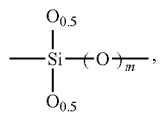

wherein:

p and q are each independently integers of 1 to 3 such that the sum p+q equals n, m is 0 or 1, L' is a straight, branched or cyclic, saturated, unsaturated or aromatic plurivalent hydrocarbon chain, A is an -A' or —O-A' group wherein A' is a straight, branched or cyclic, saturated, unsaturated or aromatic monovalent hydrocarbon chain, i is an integer varying from 1 to n, for each value of i, $R^i$ is independently a halogen or a group among —OCOCl, —COCl, —SO$_2$Cl, —COOR$_1$, —COR$_1$, —CR$_1$R$_2$Cl, —OR$_1$, —SR$_1$, —NR$_1$R$_2$, —NR$_1$COR$_2$, —COR$_1$NR$_2$, —NR$_1$—CO—NR$_2$R$_3$, —O—CO—NR$_1$, —NR$_1$—CO—OR$_2$, —CN, —NO$_2$, —NCO,

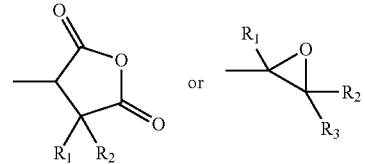

where $R_1$, $R_2$ and $R_3$ independently represent H or a straight, branched or cyclic, saturated, unsaturated or aromatic hydrocarbon chain, itself optionally substituted by one or more groups chosen from a halogen or a group among —OCOCl, —COCl, —SO$_2$Cl, —COOR$_4$, —COR$_4$, —CR$_4$R$_5$Cl, —SR$_4$, —NR$_4$R$_5$, NR$_4$COR$_5$, —COR$_4$NR$_5$, —NR$_4$—CO—NR$_5$R$_6$, —O—CO—NR$_4$, —NR$_4$—CO—OR$_5$, —CN, —NO$_2$, —NCO,

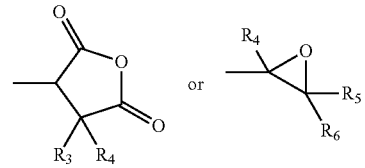

where $R_4$, $R_5$ and $R_6$ independently represent H or a straight, branched or cyclic, saturated, unsaturated or aromatic hydrocarbon chain.

n corresponds to the number of $R^i$ groups carried by the group able to form a chemical bond.

A' and/or L' are preferably a hydrocarbon chain comprising 1 to 10 carbon atoms, in particular 2 to 5 carbon atoms. A' is preferably an alkyl, alkenyl, aryl, arylalkyl or alkylaryl. Phenyl is the preferred aryl.

When L represents

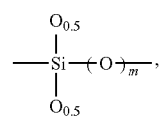

n is 1 and the groups able to form a chemical bond are in the form of oligomers having the repeat unit

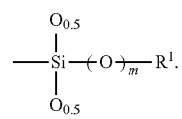

The surface of the nanoparticle has the following formula for example for an oligomer comprising three repeat units:

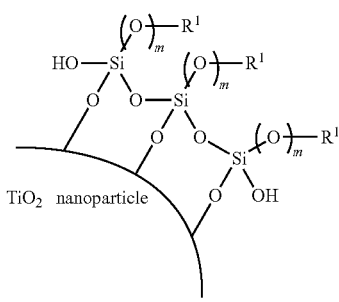

L is preferably a —Si-(A)$_{3-n}$(L')$_p$(O-L')$_q$- group. The group able to form a chemical bond then has following formula (II):

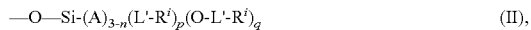

where A, n, p, q, i, L' and R$^i$ are such as defined above.

The —O—Si— function is advantageously more resistant than the ester (-L- represents —(CO)-L'-) or carbamate (-L- represents —(CO)—NH-L'-) functions. The pipes of the invention comprising a layer comprising a polymer resin comprising titanium dioxide nanoparticles comprising formula (II) groups on the surface are therefore generally more stable over time and less chemically degraded by the fluid conveyed in the pipe.

The —COOH group is a particularly preferred R$^i$ group.

In the layer of underwater flexible pipe of the invention, the surface-modified nanoparticles of titanium dioxide are chemically bonded to the polymer by means of the group(s) able to form a chemical bond.

In a first embodiment, the chemical bond between the surface-modified nanoparticles of titanium dioxide and the polymer in the layer of the pipe is a covalent bond. This chemical bond may in particular be a bond of ester, amide, amine, ether, thioether, urea, imine, imide, sulfonamide, carbamate or phosphate type. This embodiment is particularly preferred since covalent bonds are generally the most stable chemical bonds.

In a second embodiment, the chemical bond between the surface-modified nanoparticles of titanium dioxide and the polymer in the layer of the pipe is a hydrogen bond. This chemical bond exists in the presence of at least one hydrogen bond donor and at least one hydrogen bond acceptor, one being on the nanoparticles and the other on the polymer. The acceptor is notably a fluorine, nitrogen or oxygen atom and the donor is an acid H, typically an H carried by an amine or an alcohol, but also an amide, a urea, a carbamate . . . . Preferably the titanium dioxide nanoparticles are carriers of surface COOH groups which are particularly efficient in forming hydrogen bonds with the polymer.

The polymer resin comprising surface-modified nanoparticles of titanium dioxide bonded via a hydrogen bond to the polymer advantageously has reduced humidity absorption capacity, as the functions able to form hydrogen bonds of the polymer are already engaged in hydrogen bonds with the nanoparticles and are no longer available to form hydrogen bonds with water.

In a third embodiment, the polymer and the nanoparticles of the pipe layer are bonded both by covalent bonds and by hydrogen bonds.

The nanoparticles of the pipe layer generally have a mean diameter of less than 300 nm, in particular less than 200 nm, preferably less than 100 nm, in particular less than 50 nm. The smaller the mean diameter of the nanoparticles the more the specific surface area of the nanoparticles increases, which allows an increase in the number of chemical bonds between the nanoparticles and the polymer, in particular when the chemical bonds are hydrogen bonds, and thereby a reduction in the mobility of the polymer chains in relation to each other, leading to an improvement in the creep resistance of the polymer resin.

Titanium dioxide exists in different crystalline forms. The titanium dioxide of the nanoparticles of the pipe layer can be in rutile, anatase, brookite, srilankite, TiO$_2$ α or TiO$_2$ β form, preferably it is in anatase and/or rutile form.

The polymer of the layer of the flexible pipe is a polymer capable of binding chemically to the nanoparticles, typically via hydrogen and/or covalent bonds.

In general, the polymer of the flexible pipe layer is a polyamide, a homopolymer or copolymer of vinylidene polyfluoride optionally comprising functional side chains, or a polyethylene comprising functional side chains. Functional side chains are for example side chains carrying COOH, NH$_2$, OH, epoxide, nitrile, anhydride groups. The polymers Kynar® ADX 710, 711, 720 and 721 sold by Arkema for example can be used.

A homopolymer or copolymer of vinylidene polyfluoride suitable for the invention carries fluoride functions with which the surface-modified nanoparticles of titanium dioxide are able to form hydrogen bonds.

A homopolymer or copolymer of vinylidene polyfluoride comprising functional side chains or a polyethylene comprising functional side chains suitable for the invention comprises functional side chains for example side chains carrying COOH, NH$_2$, OH, epoxide, nitrile, anhydride groups, with which the surface-modified nanoparticles of titanium dioxide are able to form hydrogen and/or covalent bonds.

A polyamide suitable for the invention is typically a carrier of a terminal amine function and/or a terminal carboxylic acid function and amide functions. The polyamide may also comprise functional side chains, for example side chains carrying COOH, NH$_2$, OH, epoxide, nitrile, anhydride groups. Therefore in one embodiment, the group of nanoparticles at step a) is able to form a hydrogen and/or covalent bond with the amide, carboxylic acid, amine functions of the polyamide and/or the functions of the side chains of the polyamide.

Preferably the polymer of the flexible pipe layer is a polyamide. The polyamide of the layer of the underwater flexible pipe may be a homopolyamide or copolyamide, such as for example polyamide 6, polyamide 4.6, polyamide 6.6, polyamide 11, polyamide 12, polyamide 12.12, polyamide 10.12, polyamide 6.10, polyamide 6.12, polyamide 6.9, polyamide 9.9, polyamide 9T, polyamide 12T, polyamide 10T, polyamide 12I, polyamide 12T, polyamide 12T.12, polyamide 10T.12, polyamide 12T.106, polyamide 10T.106, polyamide 6.66, polyamide 6.612, polyamide 6.66.610, polyamide 6.66.12, polyamide 6.6T, polyamide 6T.6, polyamide 6T.12, polyamide 6T.6I, polyamide 6I.6T, polyamide 6.6I, polyamide 6T.66, polyamide 6T.66.12, polyamide 12.MACMI, polyamide 66.6I.6T, polyamide MXD6.6, MXD10, a polyphthalamide, polyarylamide, polyesteramide, polyetheresteramide, polyetheramide or mixtures thereof.

Preferably, the polyamide is chosen from among polyamide 11, polyamide 12, polyamide 6.12 and a polyphthalamide.

The layer of the flexible underwater pipe comprising a polymer resin may also comprise additives such as: antioxidants, plasticizers and any other filler such as carbon black.

The layer comprising a polymer resin comprising surface-modified nanoparticles of titanium dioxide chemically bonded to the polymer may in particular be the inner sealing polymeric sheath of a flexible underwater pipe such as defined above, but it may also be an intermediate layer located between two other layers.

In one embodiment, the flexible underwater pipe further comprises the following layers:
at least one tensile armour ply,
optionally a pressure vault, and
optionally a metal carcass.

A second subject of the invention concerns a method for preparing the above-mentioned flexible underwater pipe comprising the following steps:
a) forming a polymer resin comprising surface-modified nanoparticles of titanium dioxide chemically bonded to the polymer comprising the mixture of a polymer and titanium dioxide nanoparticles comprising at least one group able to form a chemical bond, preferably a hydrogen and/or covalent bond with the said polymer,
b) extruding the mixture obtained at step a) to form a layer comprising the said resin,
c) assembling the layer obtained at step b) with at least one other layer.

The said group able to form a hydrogen and/or covalent bond with the said polymer is preferably chosen from among the groups able to form a hydrogen and/or covalent bond with the said polymer and in particular is chosen from among the groups of the aforementioned formula (I).

The mixing at step a) can particularly be carried out by melt mixing of the polymer, compounding, extrusion, reactive extrusion (i.e. conducting steps a) and b) simultaneously). Except when step a) is conducted by reactive extrusion, the mix of step a) can be used either as masterbatch or as main matrix to form the layer comprising the polymer resin.

In general, at step a) of the method when the mixture of polymer and surface-modified nanoparticles of titanium dioxide forms the main matrix, 0.2 to 10% by weight, in particular 0.5 to 8% by weight, preferably 1 to 5% by weight of surface-modified nanoparticles of titanium dioxide are used relative to the total weight of the mix. When the mix of the polymer and surface-modified nanoparticles of titanium dioxide is used as masterbatch, the weight percentage of the surface-modified nanoparticles of titanium dioxide in the polymer resin may reach 30% even 50%.

At step a) of the method additives can be added, in particular those mentioned above.

In one embodiment of the method, the said group is able to form a covalent bond with the polymer and is preferably chosen from among the above-mentioned formula (I) groups in which at least one $R^i$ is chosen from a halogen or a group from among —COCl, —OCOCl, —SO$_2$Cl, —COOH, —CR$_1$R$_2$Cl, —OH, —SH, —NR$_1$H, —CN, —NCO,

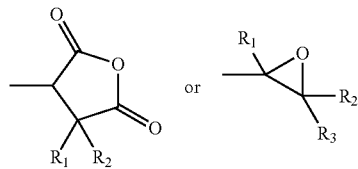

where $R_1$, $R_2$ and $R_3$ are such as defined above.

Therefore, at step a), at least one covalent bond is formed between the polymer and the surface-modified nanoparticles.

By way of illustration, titanium dioxide nanoparticles comprising a surface group carrying:
a halogen function: can form an amine bond with an amine function of the polymer (by nucleophilic substitution),
an alcohol function: can form an ester bond with a carboxylic acid function of the polymer,
a thiol function: can form a thioester bond with a carboxylic acid function of the polymer,
an epoxide function: can form an ester bond with a carboxylic acid function of the polymer and/or an amine bond with an amine function of the polymer,
an amine function: can form an amide bond with a carboxylic acid function of the polymer,
a carboxylic acid, acyl chloride, or anhydride function: can form an amide bond with an amine function of the polymer,
an isocyanate function: can form an urea bond with an amine function of the polymer,
a chloroformate function: can form a carbamate bond with an amine function of the polymer,
sulfonyl polymer function: can form a sulfonamide bond with the amine function of the polymer.

In this embodiment the method may comprise, prior to step b), a chemical coupling step to form a covalent bond between the said group and the functions of the polymer.

This chemical coupling step can be catalysed, in particular by heat, radiation or a catalyst. For example, if the polymer carries a carboxylic acid function, the esterification reaction between the surface hydroxyl function of the titanium dioxide nanoparticles and the carboxylic acid function of a polymer can be catalysed by a base. It is within the reach of persons skilled in the art to adapt the chemical coupling conditions (temperature, pressure, use of a catalyst, reaction time) to allow forming of the covalent bond.

The chemical coupling step can be conducted at the same time as step a). The chemical coupling then takes place at the time of mixing the nanoparticles and the polymer. This chemical coupling may be non-catalysed or catalysed. For example, during the mixing of the polymer and nanoparticles the medium can be heated, irradiated or a catalyst can be added in addition to the polymer and nanoparticles. The chemical coupling step can also be conducted after step a). For example, after mixing the polymer and nanoparticles the medium can be heated, irradiated or a catalyst can be added to the medium.

The increase in molecular weight and/or in the number of cross-linking points allows a reduction in the mobility of the polymer chains in relation to each other and thereby the obtaining of a polymer having improved creep resistance. A flexible underwater pipe comprising a said polymer is therefore adapted for use in the conveying of fluids under high pressure and high temperature.

In a second embodiment of the method the said group is able to form a hydrogen bond with the polymer and is chosen from the formula (I) groups such as defined above where at least one $R^i$ is a group chosen from among —F, —COOR$_1$, —COR$_1$, —OR$_1$, —SR$_1$, —NR$_1$R$_2$, —NR$_1$COR$_2$, —COR$_1$NR$_2$, —NR$_1$—CO—NR$_2$R$_3$, —O—CO—NR$_1$, —NR$_1$—CO—OR$_2$, —CN, —NO$_2$ where $R_1$ and $R_2$ are such as defined above.

Preferably the surface-modified nanoparticles of titanium dioxide carry COOH groups which are particularly efficient in forming hydrogen bonds with the functions of the polymer. Therefore at step a) hydrogen bonds are formed between the polymer ad the nanoparticles.

The extrusion step b) can be conducted using any method known to persons skilled in the art.

In general, the resin obtained at the end of step a) is dried, typically in an oven at a temperature higher than 70° C., generally for several hours, for example four hours at 80° C., before being fed into a single-screw, twin-screw or reactive extruder (in this case steps a) and b) are simultaneous since the mixing of the nanoparticles with the polymer and extrusion are carried out on the same tooling) or a co-extruder allowing the forming of a layer comprising a polymer resin comprising surface-modified nanoparticles of titanium dioxide chemically bonded to the polymer.

The layer comprising the resin obtained at the end of step b) is typically tubular, generally having a diameter of 50 mm to 600 mm, preferably 50 to 400 mm, with a thickness of 1 mm to 150 mm, preferably 30 to 80 mm and a length of 1 m to 10 km.

The method comprises an assembly step c) of the layer obtained at step b) with at least one other layer to form the flexible underwater pipe, in particular with an external polymeric sheath, a tensile armour ply, optionally a pressure vault and optionally a metal carcass.

In one embodiment, the extrusion of the mixture obtained at step a) is performed on another layer, typically the carcass, to obtain an assembly (carcass/polymer resin layer comprising surface-modified nanoparticles of titanium dioxide chemically bonded to the polymer) which is then added to and rolled with at least one other layer at step c) typically a pressure vault, tensile armour ply and an external polymeric sheath. This embodiment particularly allows the obtaining of rough bore flexible pipes.

In another embodiment, the extrusion of the mixture obtained at step a) is independent and the layer obtained after step b) is then added to and rolled with at least one other layer at step c), typically a pressure vault, tensile armour plies and an external polymeric sheath. This embodiment particularly allows the obtaining of flexible smooth bore pipes.

The layers are assembled to form a flexible underwater pipe of non-bonded type such as described in the standard documents published by the American Petroleum Institute (API), API 17J and API RP 17B.

Surface-modified nanoparticles of titanium dioxide are commercially available, for example the nanoparticles Aeroxyde® T805 by Evonik®, which are surface modified by reaction with trimethoxyoctyl silane. The titanium dioxide nanoparticles used as starting product can notably be $TiO_2$ Aeroxide® P25 nanoparticles marketed by Evonik.

Surface modified nanoparticles of titanium dioxide can be obtained using methods known to those skilled in the art by reaction of the hydroxyl functions naturally present on the surface of titanium dioxide nanoparticles, in particular by esterification (L is —(CO)-L'), etherification (L is -L'-), the formation of a carbamate bond (L is —(CO)—NH-L'-) or the formation of a —O—Si bond (L is —Si-$(A)_{3-n}(L')_p(O-L')_q$-), as described by Siwinska-Stefanska et al., (Physicochemical Problems of Mineral Processing, 41 (2007), 205-214.

In particular, the formula (II) groups can be formed by reaction of the hydroxyl functions naturally present on the surface of titanium dioxide nanoparticles with the following formula (III) compounds:

$$A\text{-}O\text{—}Si\text{-}(A)_{3-n}(L'\text{-}R^i)_p(O\text{-}L'\text{-}R^i)_q \quad \text{(III)},$$

where A, n, p, q, i, L' and $R^i$ are such as defined above. The reaction is illustrated by the scheme below:

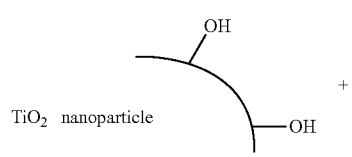

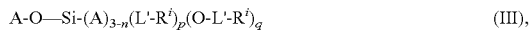

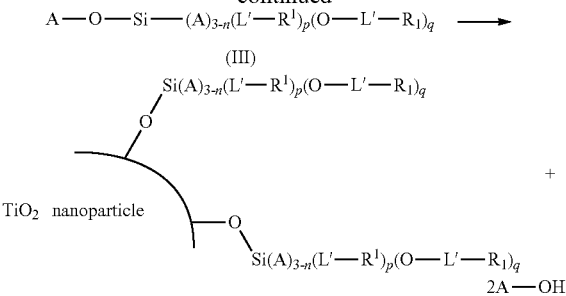

Therefore in one embodiment the method, before step a), comprises a step to prepare titanium dioxide nanoparticles having a formula (II) group on the surface able to form a bond, hydrogen and/or covalent, with a polymer by reaction of titanium dioxide particles with a formula (III) compound such as defined above.

The reaction can be conducted in an aqueous, alcohol or hydro-alcohol solution, the alcohol preferably being methanol or ethanol. An ethanol/water solution is particularly preferred, in particular a 95/5 ethanol/water solution whose pH is adjusted to a value of 4.5 to 5.5 through the addition of acetic acid. The reaction temperature is typically equal to or higher than ambient temperature, preferably from 18° C. to 40° C. After the reaction, the nanoparticles are generally decanted, rinsed e.g. in ethanol and dried.

A third subject of the present invention is a flexible underwater pipe which can be obtained using the above method.

The presence of surface-modified titanium dioxide nanoparticles chemically bonded to the polymer in a polymer resin used as layer for a flexible underwater pipe according to the invention has the following advantages:

- the creep resistance of the resin can be improved by adapting the percentage of nanoparticles added to the resin and the type of nanoparticles used, more particularly in relation to the type of group able to bind with the polymer and hence to the type of bond with the polymer (covalent or hydrogen bond and type of covalent bond [ester, amide, sulfonamide, . . . ]), and in relation to the number of groups capable of forming a chemical bond with the polymer,
- the creep resistance of the resin is improved whilst maintaining, even improving, the other mechanical properties such as tensile and bending strength, and rigidity,
- the resin's humidity absorption capacity is reduced and its rate of degradation is therefore retarded,
- the dispersion of the nanoparticles in the resin is improved via the chemical bonds between the nanoparticles and the polymer,
- the rate of propagation of cracks in the resin is reduced,
- the surface-modified nanoparticles of titanium dioxide are low cost,
- the preparation of the pipe according to the invention can be obtained using standard production equipment for flexible pipes (conventional mix and extrusion techniques).

These advantages allow the use of the flexible underwater pipe for conveying fluids. Therefore a fourth subject of the invention is the use of the aforementioned flexible underwater pipe for conveying fluids, in particular gases or liquids, preferably hydrocarbons.

BRIEF DESCRIPTION OF THE DRAWINGS

Other particular aspects and advantages of the invention will become apparent on reading the description below of particular embodiments of the invention given by way of indication but non-limiting, with reference to the FIGURE.

The FIGURE is a partial, perspective schematic view of a flexible pipe according to the invention.

FIG. 1 illustrates a pipe conforming to the invention, comprising from outside to inside:
- an external so-called sealing polymeric sheath 10 (called external sheath),
- an external armour tensile ply 12, an inner armour tensile ply 14 wound in opposite direction to the external layer 12,
- a pressure vault 18 bearing the load of radial forces generated by the pressure of the conveyed fluid,
- an inner so-called sealing polymeric sheath 20 comprising a polymer resin comprising surface-modified titanium dioxide nanoparticles according to the invention, and
- an inner carcass 22 to prevent radial collapse.

DESCRIPTION OF PREFERRED EMBODIMENTS

Owing to the presence of the inner carcass 22 this pipe is a rough bore pipe. The invention could also be applied to a so-called smooth bore pipe which does not comprise an inner carcass.

Also, it would remain within the scope of the invention if the pressure vault 18 is omitted provided that the helical angles of the constituent wires of the amour layers 12, 14 are close to 55° and are wound in opposite direction.

The armour plies 12, 14 are obtained by winding on a long pitch an assembly of wires in metal or composite material of generally substantially rectangular cross-section. The invention would also apply if these wires were of circular or complex cross-sectional geometry e.g. of T-shaped self-stapling type. In FIG. 1 only two amour layers 12 and 14 are illustrated, but the pipe could also comprise one or more additional pairs of armour plies. The armour ply 12 is said to be an external layer since here it is the last layer in the direction moving away from the inside of the pipe before the external sealing sheath 10.

The flexible pipe may also comprise layers not illustrated in FIG. 1, such as:
- a retaining layer between the external polymeric sheath 10 and the armour tensile plies 12 and 14, or between two armour tensile plies,
- one or more anti-wear layers in polymeric material in contact either with the inner surface of the aforementioned retaining layer or with its external surface, or with both surfaces, this anti-wear layer preventing the retaining layer from wearing in contact with the metal armouring. The anti-wear layers which are well known to those skilled in the art are generally prepared by helical winding of one or more tapes obtained by extruding a polymeric material containing a polyamide, polyolefins or PVDF (polyvinylidene fluoride). Reference can be made to document WO2006/120320 which describes anti-wear layers formed of tapes in polysulfone (PSU), polyethersulfone (PES), polyphenylsulfone (PPSU), polyetherimide (PEI), polytetrafluoroethylene (PTFE), polyetheretherketone (PEEK) or phenylene polysulfide (PPS).

What is claimed is:

1. A flexible underwater pipe intended for the transport of fluids, comprising:
   at least one layer comprising a polymer resin comprising surface-modified nanoparticles of titanium dioxide bonded by a covalent bond to the polymer; and
   at least one tensile armour ply;
   wherein the polymer is a polyamide, a homopolymer or copolymer of vinylidene polyfluoride optionally comprising functional side chains, or a polyethylene comprising functional side chains.

2. The flexible underwater pipe according to claim 1, wherein the titanium dioxide nanoparticles comprise at least one group on their surface capable of forming a chemical bond having the following formula (I):

$$\text{—O-L-(R}^i\text{)}_n \quad (I),$$

wherein:

n is 1, 2 or 3,

-L- is a linker substituted by n $R^i$ groups, L being chosen from among:

an -L'-, —(CO)-L'-, —(CO)—NH-L'-, —Si-(A)$_{3-n}$(L')$_p$(O-L')$_q$- or

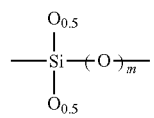

group wherein:

p and q independently are integers of 1 to 3 such that the sum p+q equals n, m is 0 or 1, L' is a straight, branched or cyclic, saturated, unsaturated or aromatic plurivalent hydrocarbon chain, A is an -A' or —O-A' group where A' is a straight, branched or cyclic, saturated, unsaturated or aromatic monovalent hydrocarbon chain, i is an integer varying from 1 to n, for each value of i, $R^1$ is independently chosen from a halogen or from a group among —OCOCl, —COCl, —SO$_2$Cl, —COOR$_1$, —COR$_1$, —CR$_1$R$_2$Cl, —OR$_1$, —SR$_1$, —NR$_1$R$_2$, —NR$_1$COR$_2$, —COR$_1$NR$_2$, —NR$_1$—CO—NR$_2$R$_3$, —O—CO—NR$_1$, —NR$_1$—CO—OR$_2$, —CN, —NO$_2$, —NCO,

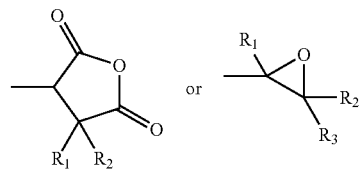

where R$_1$, R$_2$ and R$_3$ are independently H or a straight, branched or cyclic, saturated, unsaturated or aromatic hydrocarbon chain, itself optionally substituted by one or more groups chosen from among a halogen or from a group among —OCOCl, —COCl, —SO$_2$Cl, —COOR$_4$, —COR$_4$, —CR$_4$R$_5$Cl, —OR$_4$, —SR$_4$, —NR$_4$R$_5$, NR$_4$COR$_5$, —COR$_4$NR$_5$, —NR$_4$—CO—NR$_5$R$_6$, —O—CO—NR$_4$, —NR$_4$—CO—OR$_5$, —CN, —NO$_2$, —NCO,

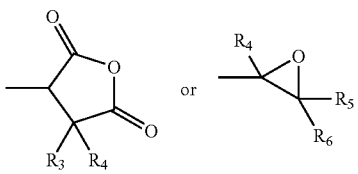

where $R_4$, $R_5$ and $R_6$ are each independently H or a straight, branched or cyclic, saturated, unsaturated or aromatic hydrocarbon chain.

3. The flexible underwater pipe according to claim 2, wherein the titanium dioxide nanoparticles on their surface comprise at least one group capable of forming a chemical bond having following formula (II):

where A, n, p, q, i, L' and $R^i$ as defined in claim 2.

4. The flexible underwater pipe according to claim 1, wherein the said at least one layer is an inner sealing polymeric sheath.

5. The flexible underwater pipe according to claim 1, further comprising the following layers:
a pressure vault; and/or
a metal carcass.

6. A method for preparing a flexible underwater pipe according to claim 1, comprising the following steps:
a) forming a polymer resin comprising surface-modified titanium dioxide nanoparticles bonded chemically to the polymer comprising the mixture of a polymer and titanium dioxide nanoparticles comprising on their surface a group capable of forming a chemical bond with a polymer,
b) extruding the mixture obtained at step a) to form a layer comprising the said resin,
c) assembling the layer obtained at step b) with at least one other layer.

7. The method according to claim 6, wherein the said group meets formula (I);

wherein:
n is 1, 2 or 3,
-L- is a linker substituted by n $R^i$ groups, L being chosen from among:
an -L'-, —(CO)-L'-, —(CO)—NH-L'-, —Si-(A)$_{3-n}$(L')$_p$(O-L')$_q$- or

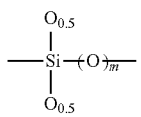

group
wherein:
p and q independently are integers of 1 to 3 such that the sum p+q equals n,
m is 0 or 1,
L' is a straight, branched or cyclic, saturated, unsaturated or aromatic plurivalent hydrocarbon chain,
A is an -A' or —O-A' group where A' is a straight, branched or cyclic, saturated, unsaturated or aromatic monovalent hydrocarbon chain,
i is an integer varying from 1 to n, for each value of i, $R^i$ is independently chosen from a halogen or from a group among —OCOCl, —COCl, —SO$_2$Cl, —COOR$_1$, —COR$_1$, —CR$_1$R$_2$Cl, —OR$_1$, —SR$_1$, —NR$_1$R$_2$, —NR$_1$COR$_2$, —COR$_1$NR$_2$, —NR$_1$—CO—NR$_2$R$_3$, —O—CO—NR$_1$, —NR$_1$—CO—OR$_2$, —CN, —NO$_2$, —NCO,

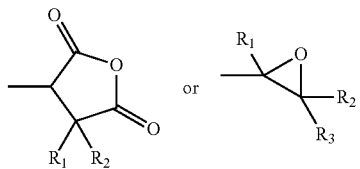

where $R_1$, $R_2$ and $R_3$ are independently H or a straight branched or cyclic, saturated, unsaturated or aromatic hydrocarbon chain, itself optionally substituted by one or more groups chosen from among a halogen or from it group among —OCOCl, —COCl, —SO$_2$Cl, —COOR$_4$, COR$_4$, CR$_4$R$_5$Cl, —OR$_4$, —SR$_4$, —NR$_4$R$_5$, —NR$_4$COR$_5$, —COR$_4$NR$_5$, —NR$_4$—CO—NR$_5$R$_6$, —O—CO—NR$_4$, —NR$_4$—CO—OR$_5$, —CN, —NO$_2$, —NCO,

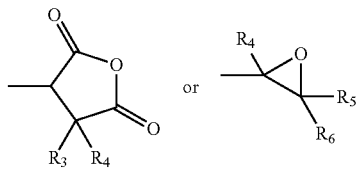

where $R_4$, $R_5$, and $R_6$ are each independently H or a straight, branched or cyclic, saturated, unsaturated or aromatic hydrocarbon chain.

8. The method according to claim 7, wherein the said group is capable of forming a covalent bond and is chosen from among the groups of formula (I) as defined in claim 7 where at least one $R^i$ is chosen from a halogen or from a group among —COCl, —OCOCl, —SO$_2$Cl, —COOH, —CR$_1$R$_2$Cl, —OH, —SH, —CR$_1$R$_2$Cl, —OH, —SH, —NR$_1$H, —CN, —NCO,

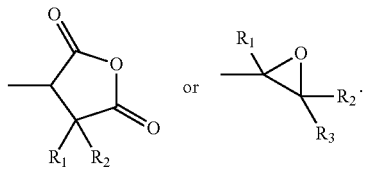

9. The method according to claim 6, comprising a chemical coupling step to form a covalent bond between the said group and the functions of a polymer.

10. The method according to claim 9, wherein the chemical coupling is catalysed by heat, radiation or a catalyst.

11. The method according to claim 7, wherein the said group is capable of forming a covalent bond and is chosen from among the groups of formula (I) such as defined in claim 8 wherein at least one $R^i$ is a group chosen from among —F, —COOR$_1$, —COR$_1$, —OR$_1$, —SR$_1$, —NR$_1$R$_2$, —NR$_1$COR$_2$, —COR$_1$NR$_2$, —NR$_1$—CO—NR$_2$R$_3$, —O—CO—NR$_1$, —NR$_1$—CO—OR$_2$, —CN, —NO$_2$.

12. The method according to claim 7 which, before step a), further comprises a step to prepare titanium dioxide nanoparticles comprising on their surface a group capable of forming a covalent bond with a polymer, the said group having following formula (II):

$$—O—Si-(A)_{3-n}(L'-R^i)_p(O-L'-R^i)_q \quad (II)$$

by reaction of titanium dioxide nanoparticles with a compound of following formula (III):

$$A-O—Si-(A)_{3-n}(L'-R^i)_p(O-L'-R^i)_q \quad (III)$$

wherein:
  n is 1, 2 or 3,
  -L- is a linker substituted by n $R^i$ groups, L being chosen from among:
    an -L'-, —(CO)-L'-, —(CO)—NH-L'-, —Si-(A)$_{3-n}$(L')$_p$(O-L)$_q$- or

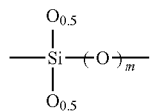

group
  wherein:
    p and q independently are integers of 1 to 3 such that the sum p+q equals n,
    m is 0 or 1,
    L' is a straight, branched or cyclic, saturated, unsaturated or aromatic plurivalent hydrocarbon chain,
    A is an -A' or —O-A' group where A' is a straight, branched or cyclic, saturated, unsaturated or aromatic monovalent hydrocarbon chain,
    i is an integer varying from 1 to n,
    for each value of i, $R^i$ is independently chosen from a halogen or from a group among —OCOCl, —COCl, —SO$_2$Cl, —COOR$_1$, —COR$_1$, —CR$_1$R$_2$Cl, —OR$_1$, —SR$_1$, —NR$_1$R$_2$, —NR$_1$COR$_2$, —COR$_1$NR$_2$, —NR$_1$—CO—NR$_2$R$_3$, —O—CO—NR$_1$, —NR$_1$—CO—OR$_2$, —CN, —NO$_2$, —NCO,

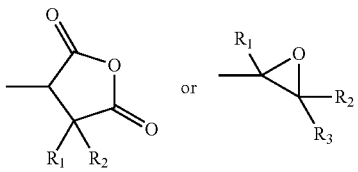

where R$_1$, R$_2$ and R$_3$ are independently H or a straight, branched or cyclic, saturated, unsaturated or aromatic hydrocarbon chain, itself optionally substituted by one or more groups chosen from among a halogen or from a group among —OCOCl, —COCl, —SO$_2$Cl, —COOR$_4$, —COR$_4$, —CR$_4$R$_5$Cl, —OR$_4$, —SR$_4$, —NR$_4$R$_5$, NR$_4$COR$_5$, —COR$_4$NR$_5$, —NR$_4$—CO—NR$_5$R$_6$, —O—CO—NR$_4$, —NR$_4$—CO—OR$_5$, —CN, —NO$_2$, —NCO,

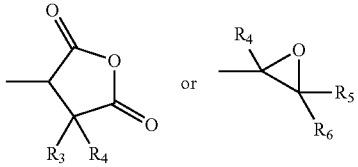

where R$_4$, R$_5$ and R$_6$ are each independently H or a straight, branched or cyclic, saturated, unsaturated or aromatic hydrocarbon chain.

13. A flexible underwater pipe able to be obtained using a method according to claim 6.

14. A method for conveying fluids, in particular gases or liquids, by use of a flexible underwater pipe according to claim 1.

15. The method according to claim 14, for conveying hydrocarbons.

16. The flexible underwater pipe according to claim 1, wherein the vinylidene polyflouride comprises side chains.

17. The flexible underwater pipe according to claim 1, wherein the vinylidene polyflouride does not comprise side chains.

* * * * *